(12) United States Patent
Lee et al.

(10) Patent No.: US 12,276,879 B2
(45) Date of Patent: Apr. 15, 2025

(54) POLARIZING PLATE AND OPTICAL DISPLAY APPARATUS COMPRISING THE SAME

(71) Applicant: SAMSUNG SDI CO., LTD., Yongin-si (KR)

(72) Inventors: Jeong Ho Lee, Suwon-si (KR); Young Oh, Suwon-si (KR); Young Hyun Ju, Suwon-si (KR); Dong Ho Wee, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 128 days.

(21) Appl. No.: 18/052,175

(22) Filed: Nov. 2, 2022

(65) Prior Publication Data

US 2023/0288749 A1    Sep. 14, 2023

(30) Foreign Application Priority Data

Nov. 11, 2021 (KR) ............... 10-2021-0154454

(51) Int. Cl.
*G02F 1/1335* (2006.01)
*G02F 1/13363* (2006.01)

(52) U.S. Cl.
CPC .. *G02F 1/133531* (2021.01); *G02F 1/133634* (2013.01)

(58) Field of Classification Search
CPC ......... G02F 1/133528; G02F 1/133562; G02F 1/133504; G02F 1/133507; G02B 5/045;
(Continued)

(56) References Cited

U.S. PATENT DOCUMENTS

2002/0167725 A1* 11/2002 Goto ............... G03B 21/625
                                                    359/456
2018/0045876 A1*  2/2018 Lee ................ G02F 1/133528
(Continued)

FOREIGN PATENT DOCUMENTS

JP       2006-251659 A      9/2006
KR   10-2018-0131927 A     12/2018
(Continued)

OTHER PUBLICATIONS

Taiwanese Office Action dated Sep. 12, 2023, issued in corresponding Taiwanese Patent Application No. 111142723 (5 pages).
(Continued)

*Primary Examiner* — Alexander P Gross
(74) *Attorney, Agent, or Firm* — Womble Bond Dickinson (US) LLP

(57) ABSTRACT

A polarizing plate and an optical display apparatus including the same are provided. A polarizing plate includes: a polarizer; and a pattern layer stacked on a light exit surface of the polarizer, and the pattern layer includes a second resin layer and a first resin layer sequentially stacked from the polarizer; a first patterned portion including a plurality of first optical patterns is formed at an interface between the first resin layer and the second resin layer; and a second patterned portion including a plurality of second optical patterns is formed on a lower surface of the second resin layer, the first optical patterns and the second optical patterns satisfying Relations 1 and 2.

17 Claims, 8 Drawing Sheets

(58) Field of Classification Search
CPC ...... G02B 5/0231; G02B 5/30; G02B 5/3033;
G02B 5/3025; G02B 5/3041; G02B
5/305; G02B 6/0053
See application file for complete search history.

(56) References Cited

U.S. PATENT DOCUMENTS

| | | | |
|---|---|---|---|
| 2019/0122597 A1* | 4/2019 | Lee | G02F 1/133528 |
| 2020/0209680 A1 | 7/2020 | Jung et al. | |
| 2020/0319506 A1* | 10/2020 | Cho | G02B 5/0278 |
| 2020/0393604 A1 | 12/2020 | Lee et al. | |

FOREIGN PATENT DOCUMENTS

| | | |
|---|---|---|
| KR | 10-2019-0043900 A | 4/2019 |
| KR | 10-2020-0118647 A | 10/2020 |
| TW | 202011062 A | 3/2020 |
| TW | 202019710 A | 6/2020 |

OTHER PUBLICATIONS

Korean Office Action dated Nov. 29, 2024, issued in corresponding Korean Patent Application No. 10-2021-0154454 (6 pages).

\* cited by examiner

POLARIZING PLATE AND OPTICAL DISPLAY APPARATUS COMPRISING THE SAME

CROSS-REFERENCE TO RELATED APPLICATION

This application claims priority to and the benefit of Korean Patent Application No. 10-2021-0154454, filed on Nov. 11, 2021 in the Korean Intellectual Property Office, the entire disclosure of which is incorporated herein by reference.

BACKGROUND

1. Field

Aspects of embodiments of the present invention relate to a polarizing plate and an optical display apparatus including the same.

2. Description of the Related Art

A liquid crystal display is operated by allowing light emitted from a backlight unit to pass through a light source-side polarizing plate, a liquid crystal panel, and a viewer-side polarizing plate in the stated order. Light emitted from a light source is diffused through the backlight unit before entering the light source-side polarizing plate. As a result, there is a problem of gradual deterioration in contrast ratio from a front side to lateral sides while the light passes through the light source-side polarizing plate, the liquid crystal panel, and the viewer-side polarizing plate.

To solve this problem, a technique of adding a pattern layer to the viewer-side polarizing plate has been developed in the art. The pattern layer is formed by forming a pattern at an interface between resin layers having different indexes of refraction to improve contrast ratio and visibility by refracting light emitted from the liquid crystal panel. However, a typical pattern layer affects only light emitted through the polarizer, thereby providing a limitation in improvement in front side brightness.

The background technique of the present invention is disclosed in Japanese Unexamined Patent Publication No. 2006-251659.

SUMMARY

According to an aspect of embodiments of the present invention, a polarizing plate that improves brightness in front side and contrast ratio in front side is provided.

According to another aspect of embodiments of the present invention, a polarizing plate that minimizes or reduces observation of Moiré is provided.

According to another aspect of embodiments of the present invention, a polarizing plate that provides uniform or substantially uniform brightness and uniform or substantially uniform contrast ratio is provided.

Aspects of one or more embodiments of the present invention relate to a polarizing plate.

According to one or more embodiments, a polarizing plate comprises: a polarizer; and a pattern layer stacked on a light exit surface of the polarizer, wherein the pattern layer comprises a second resin layer and a first resin layer sequentially stacked from the polarizer; a first patterned portion comprising a plurality of first optical patterns is formed at an interface between the first resin layer and the second resin layer; and a second patterned portion comprising a plurality of second optical patterns is formed on a lower surface of the second resin layer, the first optical patterns and the second optical patterns satisfying the following Relations 1 and 2:

$$0\ \mu m < W1 \leq 15\ \mu m; \qquad \text{Relation 1}$$

$$0\ \mu m < W2 \leq (W1 \times 3), \qquad \text{Relation 2}$$

where W1 is a maximum width (unit: μm) of the first optical pattern, and W2 is a maximum width (unit: μm) of the second optical pattern.

In one or more embodiments, each of the plurality of first optical patterns may include an engraved pattern, may have a base angle of 70° to 90°, and may satisfy the following Relation 3:

$$1 < P1/W1 \leq 10, \qquad \text{Relation 3}$$

where P1 is a cycle (unit: μm) of the first patterned portion.

In one or more embodiments, the first patterned portion may include a separation surface between two adjacent first optical patterns of the plurality of first optical patterns.

In one or more embodiments, each of the plurality of first optical patterns may have a first oblique surface directly connected to the separation surface, and the first oblique surface may be a single flat surface, a curved surface, or an angled flat surface.

In one or more embodiments, filling patterns filling at least part of the first optical pattern may be formed on an upper surface of the second resin layer.

In one or more embodiments, each of the plurality of second optical patterns may include an embossed pattern, and the second patterned portion may include filling portions between adjacent second optical patterns of the plurality of second optical patterns.

In one or more embodiments, each of the plurality of second optical patterns may include a second surface on a bottom portion thereof and a second oblique surface connected to the second surface.

In one or more embodiments, a base angle defined between the maximum width of the second optical pattern and the second oblique surface may be in a range from 60° to 85°.

In one or more embodiments, the filling portion may be filled with a light reflective material having a reflectivity of 95% or more.

In one or more embodiments, the light reflective material may comprise at least one selected from among aluminum, chromium, and nickel.

In one or more embodiments, each of the plurality of first optical patterns may have an aspect ratio of 0.1 to 10, and each of the plurality of second optical patterns may have an aspect ratio of 0.5 to 5.

In one or more embodiments, a longitudinal direction of each of the plurality of second optical patterns may be tilted at an angle of −5° to 5° or at an angle of 85° to 95° with respect to a light absorption axis of the polarizer.

In one or more embodiments, a ratio of a total sum of the maximum widths of the first optical patterns to an entire width of the first resin layer and a ratio of a total sum of the widths of the filling portions to an entire width of the second resin layer may satisfy the following Relation 4:

$$1 \leq Y_1/Y_2 \leq 5,$$

where $Y_1$ is the ratio of the total sum of the maximum widths of the first optical patterns to the entire width of the first resin layer, and $Y_2$ is the ratio of the total sum of the widths of the filling portions to the entire width of the second resin layer.

In one or more embodiments, the first resin layer may have a higher index of refraction than the second resin layer.

In one or more embodiments, a difference in index of refraction between the first resin layer and the second resin layer may be greater than or equal to 0.05.

Aspects of one or more embodiments of the present invention relate to an optical display apparatus including a polarizing plate according to the present invention.

Aspect of one or more embodiments of the present invention provide a polarizing plate that improves brightness in front side and contrast ratio in front side.

Aspects of one or more embodiments of the present invention provide a polarizing plate that minimizes or reduces observation of Moiré.

Aspects of one or more embodiments of the present invention provide a polarizing plate that provides uniform or substantially uniform brightness and uniform or substantially uniform contrast ratio.

DETAILED DESCRIPTION

Figure 1:
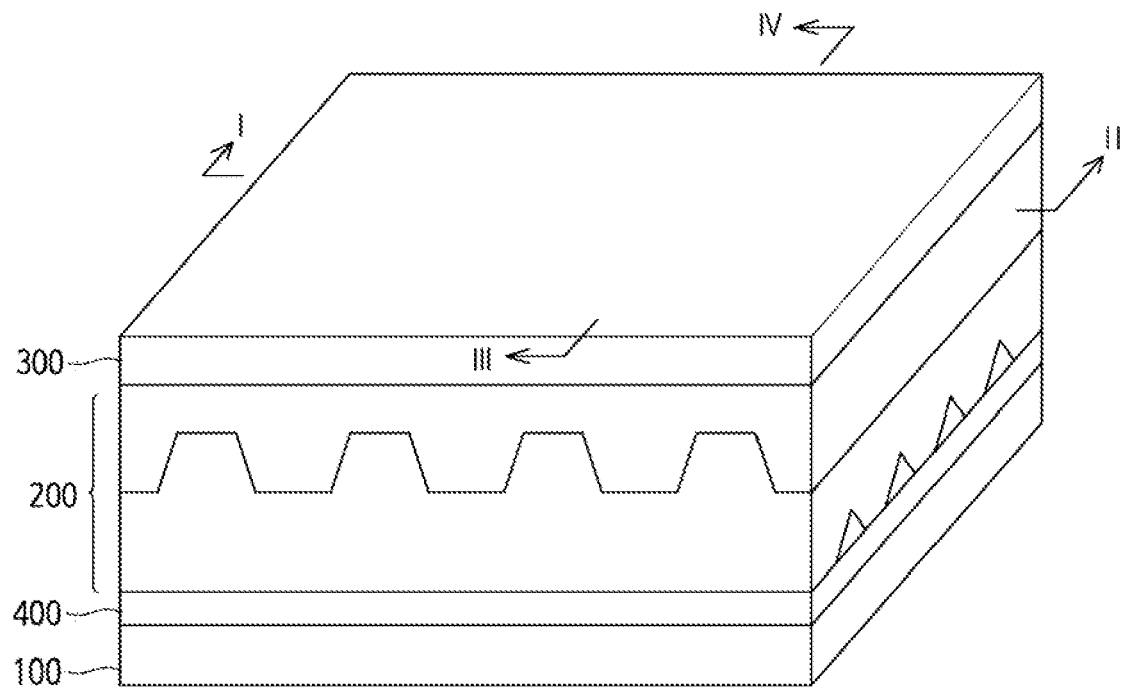
FIG. 1 is a conceptual view of a polarizing plate according to an embodiment of the present invention.

Herein, some embodiments of the present invention will be described in further detail with reference to the accompanying drawings such that the present invention can be easily implemented by those skilled in the art. It is to be understood, however, that the present invention may be embodied in different ways and is not limited to the following embodiments.

In the drawings, components unrelated to the description may be omitted for clear description of the invention, and like components will be denoted by like reference numerals throughout the specification.

Herein, spatially relative terms, such as "upper" and "lower," are defined with reference to the accompanying drawings. Thus, it is to be understood that "upper surface" can be used interchangeably with "lower surface," and when an element is referred to as being placed "on" another element, it may be directly placed on the other element, or one or more intervening elements may be present. When an element is referred to as being placed "directly on" another element, there are no intervening element(s) therebetween.

Herein, the singular forms "a," "an," and "the" are intended to include the plural forms as well, unless the context clearly indicates otherwise.

Herein, "horizontal direction" and "vertical direction" mean a longitudinal direction and a transverse direction of a rectangular screen of a liquid crystal display, respectively. Assuming that a front side is indicated by 0°, a left end point is indicated by −90°, and a right end point is indicated by 90° with reference to the horizontal direction, a lateral side refers to −60° or 60°.

Herein, "top portion" refers to the highest point of a first optical pattern.

Herein, "bottom portion" refers to the lowest point of a second optical pattern.

Herein, "aspect ratio" refers to a ratio of the maximum height of an optical pattern to the maximum width thereof (maximum height/maximum width).

Herein, "base angle" of a first optical pattern means an angle defined between the maximum width of the first optical pattern and a first oblique surface directly connected to the maximum width of the first optical pattern.

Herein, "base angle" of a second optical pattern means an angle defined between the maximum width of the second optical pattern and a second oblique surface directly connected to the maximum width of the second optical pattern.

Herein, "optical pattern" refers to optical elements repeating in a certain pattern and may be represented in the singular form or in the plural form.

Herein, "in-plane retardation (Re)" is a value measured at a wavelength of 550 nm, as calculated according to the following Equation A:

$$Re=(nx-ny)\times d,\qquad\text{Equation A}$$

where nx and ny are the indexes of refraction of an optical element in the slow axis direction and the fast axis direction at a wavelength of 550 nm, respectively, and d is the thickness (unit: nm) of the optical element.

Herein, "(meth)acryl" refers to acryl and/or methacryl.

As used herein to represent a specific numerical range, "X to Y" means "X≤ and ≤Y."

The inventors of the present invention provide a polarizing plate that can significantly improve brightness in front side and contrast ratio in front side, while minimizing or reducing observation of Moiré.

The polarizing plate according to one or more embodiments of the present invention comprises a polarizer and a pattern layer stacked on a light exit surface of the polarizer, wherein the pattern layer comprises a second resin layer and a first resin layer sequentially stacked from the polarizer; a first patterned portion comprising a plurality of first optical patterns is formed at an interface between the first resin layer and the second resin layer; and a second patterned portion comprising a plurality of second optical patterns is formed on a lower surface of the second resin layer, the first optical patterns and the second optical patterns satisfy the Relations 1 and 2 set forth herein. With this structure, the polarizing plate can minimize or reduce observation of Moiré as a result of each of the second optical patterns and the first optical patterns, when the polarizing plate is viewed at a side of the first resin layer.

Next, a polarizing plate according to an embodiment of the invention will be described with reference to FIG. 1, FIG. 2, FIG. 3, and FIG. 4.

The polarizing plate may include a polarizer 100; and an adhesive layer 400, a pattern layer 200, and a first protective layer 300, which are sequentially stacked on a light exit surface of the polarizer 100.

When the polarizing plate is applied to an optical display apparatus, the light exit surface of the polarizer 100 may constitute a light exit surface of the polarizer for internal light of the optical display apparatus. Accordingly, the adhesive layer 400, the pattern layer 200 and the first protective layer 300 may be stacked on the light exit surface of the polarizer for internal light. Herein, "internal light" means light emitted from a light source of a backlight unit and exited through the polarizer.

The pattern layer 200 is formed with a second patterned portion on a bottom portion surface thereof. In an embodiment, the second patterned portion constitutes a lower surface of a second resin layer 220.

The second patterned portion comprises a plurality of second optical patterns 221. At least part of a filling portion 223 formed between a second optical pattern 221 and an adjacent second optical pattern 221 is filled with a reflective material. That is, the second patterned portion in which the second optical pattern 221 and the filling portion 223 filled with a reflective material are alternately arranged is formed on a lower surface of the pattern layer 200. As a result, among fractions of light emitted from the polarizer 100 and reaching the pattern layer 200, a fraction of the light incident on a side surface of the pattern layer 200 other than a fraction of the light traveling in the vertical direction of the pattern layer 200 is reflected by a second oblique surface of the second optical pattern 221 towards a first optical pattern, whereby the polarizing plate can improve front side brightness and front side contrast ratio.

The pattern layer 200 further comprises a first patterned portion disposed on an upper surface of the second patterned portion, that is, on an upper surface of the pattern layer 200.

The first patterned portion is formed at an interface between a first resin layer 210 and the second resin layer 220 and comprises a plurality of first optical patterns 211 spaced apart from each other. With this structure, light having entered the second patterned portion is emitted through the first patterned portion, thereby improving both contrast ratio and visibility at a front side of an optical display apparatus.

Since the first patterned portion adjoins the second patterned portion and the pattern layer comprises the first resin layer and the second resin layer having different indexes of refraction, the first optical patterns of the first patterned portion and the second optical patterns of the second patterned portion can be observed as Moiré. The polarizing plate according to the present invention satisfies both of the following Relations 1 and 2. With this structure, when viewed from a side of the first resin layer 210, the polarizing plate can minimize or reduce observation of the Moiré occurred by each of the second optical patterns and the first optical patterns.

$$0 \ \mu m < W1 \leq 15 \ \mu m; \quad \text{Relation 1}$$

$$0 \ \mu m < W2 \leq (W1 \times 3), \quad \text{Relation 2}$$

where W1 is a maximum width (unit: μm) of the first optical pattern, and W2 is a maximum width of the second optical pattern (unit: μm).

If the polarizing plate satisfies only one among Relations 1 and 2, the first optical patterns and the second optical patterns may be strongly observed as the Moiré and thus cannot be applied to the optical display apparatus, specifically a viewer side polarizing plate.

Pattern Layer 200

Figure 2:
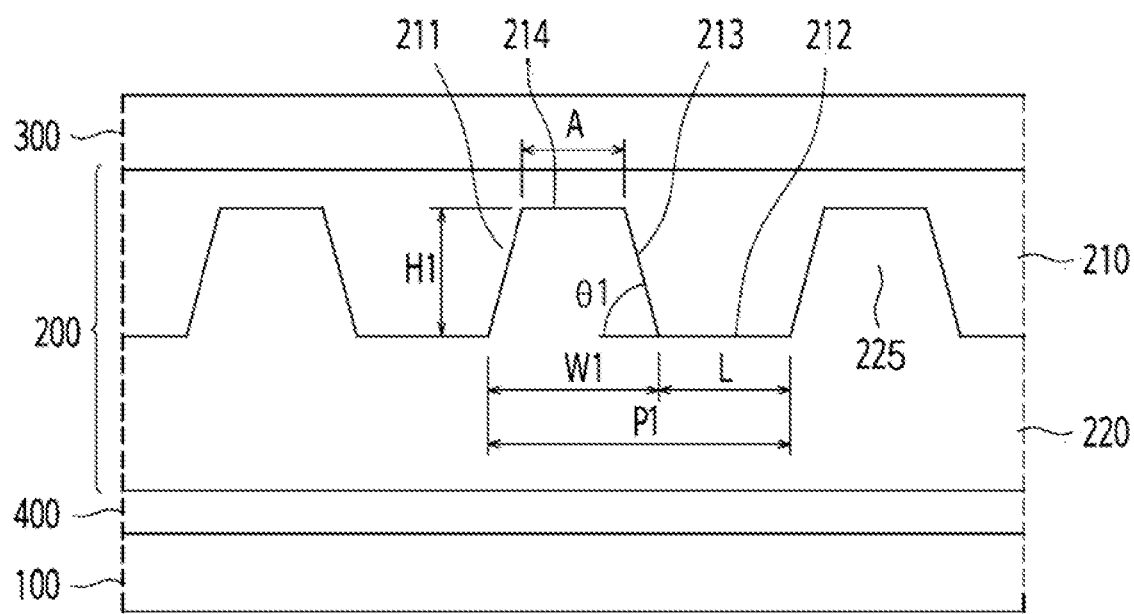
FIG. 2 is a cross-sectional view of first optical patterns taken in a width direction along a line I-II in the polarizing plate shown in FIG. 1.

Referring to FIG. 2, the pattern layer 200 may be formed between the polarizer 100 and the first protective layer 300 to emit polarized light having passed through the polarizer 100 towards the first protective layer 300.

The pattern layer 200 may include the second resin layer 220; and the first resin layer 210 facing the second resin layer 220. In an embodiment, the pattern layer 200 may be composed only of the first resin layer 210 and the second resin layer 220, which directly contact each other.

First Resin Layer 210

The first resin layer 210 is formed on a light exit surface of the second resin layer 220 for internal light. The first patterned portion is formed at the interface between the first resin layer 210 and the second resin layer 220. In an embodiment, an upper surface of the first resin layer 210 may be a totally flat surface.

The first patterned portion is provided with a plurality of first optical patterns 211. A separation surface 212 is formed between two adjacent first optical patterns 211.

Each of the first optical patterns 211 may be an engraved pattern. As shown in FIG. 2, the engraved pattern is a convex pattern protruding from the second resin layer 220 to the first resin layer 210. In another embodiment, the first optical pattern may be an embossed pattern protruding from the first resin layer 210 to the second resin layer 220. In an embodiment, the first optical pattern may be the engraved pattern to achieve more efficient realization of the effects of the present invention.

The first optical pattern 211 have a first oblique surface 213 directly connected to the separation surface 212. The first oblique surface 213 may improve contrast ratio and visibility through refraction of light traveling from the second resin layer 220 to the first resin layer 210.

The first oblique surface 213 may be a single flat, a curved, or an angled flat surface.

In an embodiment, as shown in FIG. 2, when the first oblique surface 213 is a single flat surface, the first oblique surface may have a base angle θ1 of 70° to 90°, and, in an embodiment, 80° to 90°. Within this range, the first oblique surface 213 can assist in improvement in contrast ratio and visibility. Here, the base angle θ1 means an angle defined between the maximum width of the first optical pattern and the first oblique surface 213 thereof. In an embodiment, the first optical pattern may have an N-gonal cross-section (N being an integer of 3 to 10). For example, the first optical pattern may be a rectangular, trapezoidal, or square-shaped engraved pattern.

Figure 3A:
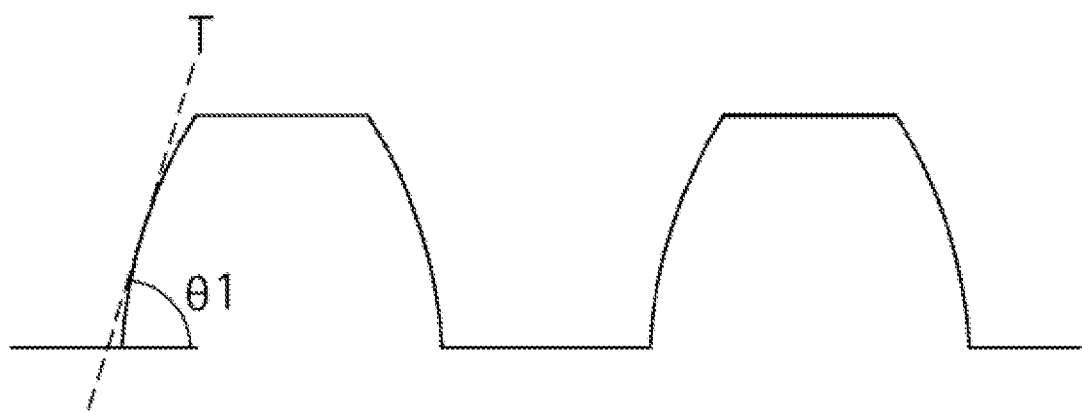
FIGS. 3A to 3E are conceptual views of some modifications of the first optical patterns.
Figure 3B:
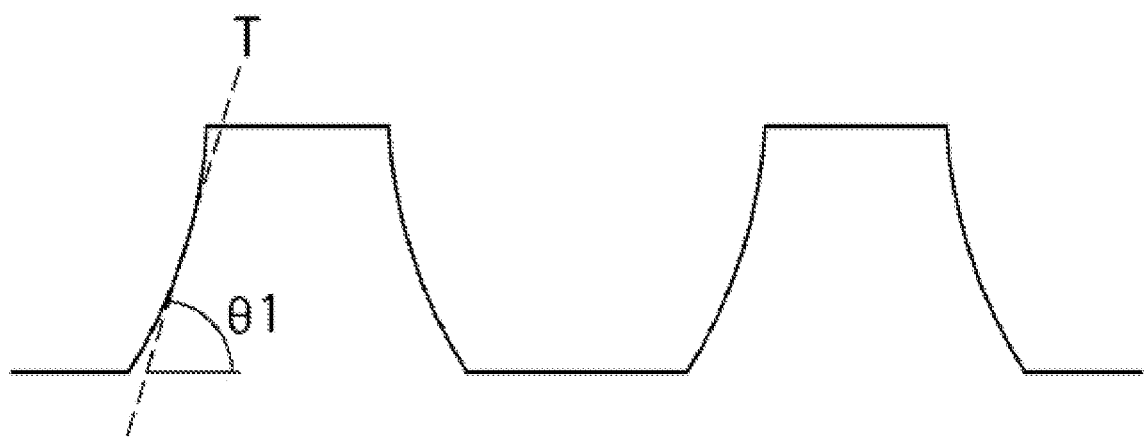

When the first oblique surface 213 is a curved surface, the first oblique surface 213 may have a base angle θ1 of 70° to 90°, and, in an embodiment, 80° to 90°, and, in an embodiment, 85° to 90°. Within this range, the first oblique surface 213 can assist in improvement in contrast ratio and visibility. As shown in FIGS. 3A and 3B, the base angle θ1 means an angle defined between a tangential line T at a most convex portion of the first oblique surface 213 and a maximum width of the first optical pattern.

In an embodiment, referring to FIG. 3A, the first optical pattern may be an engraved pattern and the first oblique surface of the first optical pattern may be a curved surface, and, in an embodiment, a convexly curved surface protruding from the second resin layer 220 to the first resin layer 210. Referring to FIG. 3B, the first optical pattern may be an engraved pattern, and the first oblique surface 213 of the first optical pattern may be a curved surface, specifically a convexly curved surface protruding from the first resin layer 210 to the second resin layer 220.

Figure 3C:
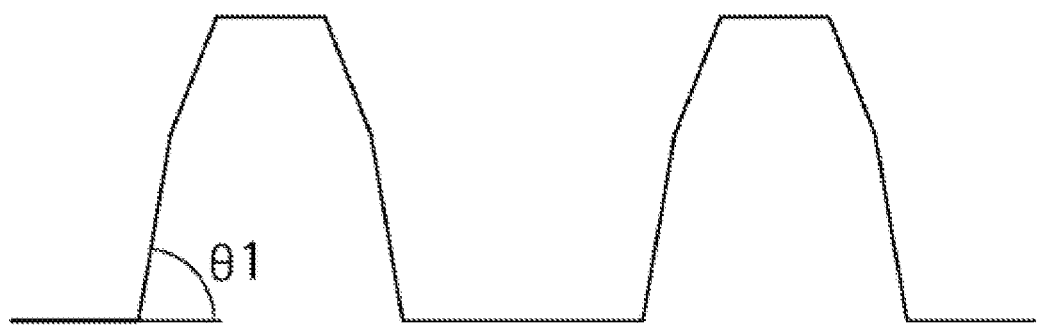
Figure 3D:
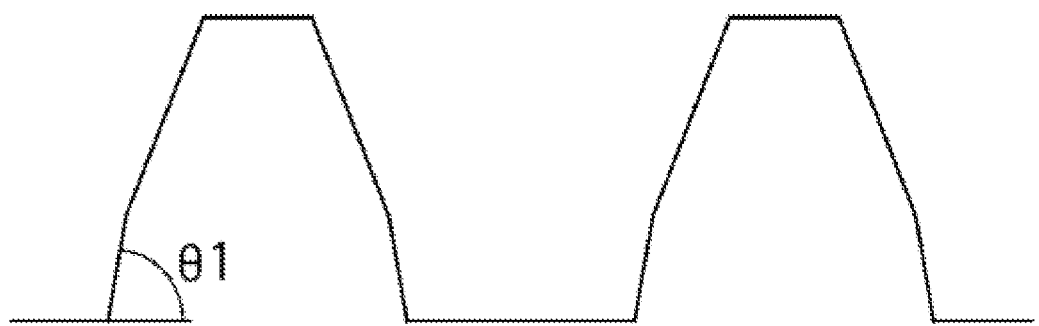

In an embodiment, when the first oblique surface 213 is an angled flat surface, the first oblique surface 213 may have a base angle θ1 of 70° to 90°, and, in an embodiment, 80° to 90°, and, in an embodiment, 85° to 90°. Within this range, the first oblique surface 213 can assist in improvement in contrast ratio and visibility. As shown in FIGS. 3C and 3D, the base angle θ1 means an angle defined between the maximum width of the first optical pattern and the first oblique surface 213.

Figure 3E:
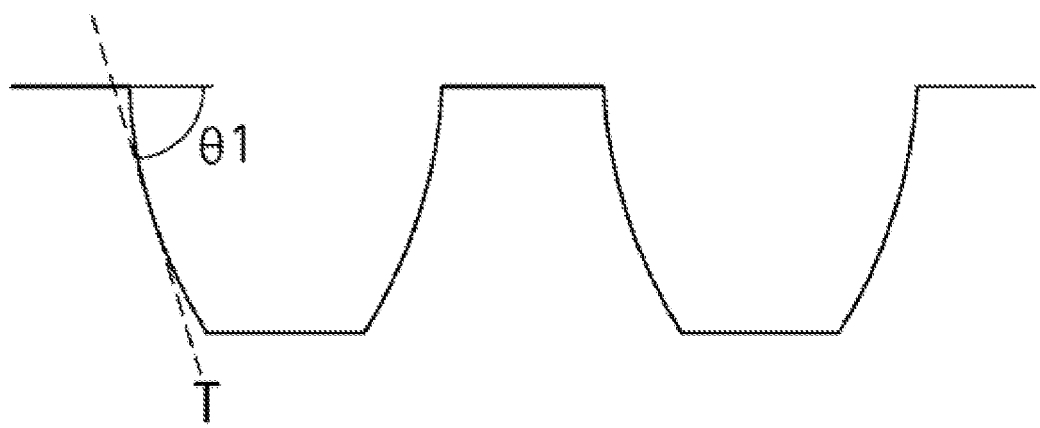

In an embodiment, when the first oblique surface 213 is a curved surface, the first oblique surface 213 may have a base angle θ1 of 70° to 90°, and, in an embodiment, 80° to 90°, and, in an embodiment, 85° to 90°. Within this range, the first oblique surface 213 can assist in improvement in contrast ratio and visibility. As shown in FIG. 3E, the base angle θ1 means an angle defined between a tangential line T at a most convex portion of the first oblique surface 213 and a maximum width of the first optical pattern.

In an embodiment, referring to FIG. 3E, the first optical pattern may be an embossed pattern and the first oblique surface 213 of the first optical pattern may be a curved surface, and, in an embodiment, a convexly curved surface protruding from the first resin layer to the second resin layer.

In an embodiment, although not shown in FIG. 3, the first optical pattern may be an embossed pattern and the first oblique surface of the first optical pattern may be a curved surface, and, in an embodiment, a convexly curved surface protruding from the second resin layer 220 to the first resin layer 210.

The maximum width W1 of the first optical pattern 211 satisfies the Relation 1. By satisfying the Relation 1, the polarizing plate can assist in minimization or reduction of observation of Moiré caused by the first optical patterns and the second optical patterns. In an embodiment, the first optical pattern 211 has a maximum width W1 of 1 μm to 15 μm, for example, 1 μm, 2 μm, 3 μm, 4 μm, 5 μm, 6 μm, 7 μm, 8 μm, 9 μm, 10 μm, 11 μm, 12 μm, 13 μm, 14 μm, 15 μm, and, in an embodiment, 5 μm to 10 μm.

The first optical pattern 211 may satisfy the following Relation 3. By satisfying Relation 3, the first optical pattern 211 can assist in improvement in lateral contrast ratio while improving the contrast ratio at the same lateral viewing angle. In an embodiment, the first optical pattern 211 may have a P1/W1 of 1.2 to 8.

$$1 < P1/W1 \leq 10, \qquad \text{Relation 3}$$

where P1 is a cycle of the first patterned portion (unit: μm), and W1 is the maximum width of the first optical pattern (unit: μm).

In an embodiment, each of the first optical patterns may have an aspect ratio (H1/W1) of 0.1 to 10, for example, 0.1, 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10, and, in an embodiment, 0.1 to 7.0, and, in an embodiment, 0.5 to 5.0, and, in an embodiment, 0.5 to 2.0. Within this range, the polarizing plate can improve contrast ratio and visibility at a lateral side of the optical display apparatus.

In an embodiment, the first optical patterns may have a maximum height H1 of greater than 0 μm to 20 μm, and, in an embodiment, 1 μm to 17 μm, and, in an embodiment, 5 μm to 15 μm. Within this range, the polarizing plate can improve the contrast ratio, viewing angle and brightness without generation of Moiré.

The separation surface 212 can improve front side brightness by guiding light having passed through the second resin layer 220 to travel to the first resin layer 210 therethrough.

In an embodiment, a ratio (W1/L) of the maximum width W1 of the first optical pattern to the width L of the separation surface 212 may be greater than 0 to 9, for example, 0.1, 0.5, 1, 1.5, 2, 2.5, 3, 3.5, 4, 4.5, 5, 5.5, 6, 6.5, 7, 7.5, 8, 8.5, or 9, and, in an embodiment, 0.1 to 3, and, in an embodiment, 0.15 to 2. Within this range, the polarizing plate can reduce a difference between a front side contrast ratio and a lateral contrast ratio while improving contrast ratio at the same lateral viewing angle and at the same front side viewing angle. In addition, the polarizing plate can prevent or substantially prevent observation of Moiré. In an embodiment, the separation surface 212 may have a width L of 1 μm to 50 μm, and, in an embodiment, 1 μm to 15 μm. Within this range, the polarizing plate can improve front side brightness.

In an embodiment, the first patterned portion may have a cycle P1 of 1 μm to 50 μm, and, in an embodiment, 5 μm to 15 μm. Within this range, the polarizing plate can assist in improvement in contrast ratio.

Each of the first optical patterns 211 may have a first surface 214 at a top portion thereof. The first surface 214 can assist in improvement in contrast ratio and brightness by refracting light to travel from the second resin layer 220 to the first resin layer 210. In an embodiment, the first surface 214 may have a maximum width A of greater than 0 μm to 10 μm, and, in an embodiment, 0 μm to 5 μm. Within this range, the first optical patterns can assist in improvement in contrast ratio.

Referring to FIG. 1 and FIG. 2, in an embodiment, adjacent first optical patterns constitute a first patterned portion composed of optical patterns having the same values in terms of the base angle, the width of the first surface, the maximum height, the maximum width, the cycle, and the width of the separation surface. In another embodiment, adjacent first optical patterns may constitute a first patterned portion composed of optical patterns having the different values in terms of the base angle, the width of the first surface, the maximum height, the maximum width, the cycle, and the width of the separation surface.

Although not clearly shown in FIG. 1 and FIG. 2, the first optical patterns may be formed in a stripe shape extending in a longitudinal direction thereof. With the stripe shape extending in the longitudinal direction thereof, the first optical patterns can provide an effect of enlarging right and left viewing angles. Here, "longitudinal direction of the first optical pattern" means a different direction than the maximum width of the first optical pattern, and, in an embodiment, a perpendicular direction with respect to the maximum width thereof.

In an embodiment, the first optical patterns may be disposed substantially parallel (at an angle of −5° to 5°, and, in an embodiment, 0°) or substantially orthogonal (at an angle of 85° to 95°, and, in an embodiment, 90°) to a light absorption axis of the polarizer (machine direction (MD) of the polarizer) in a longitudinal direction thereof. In an embodiment, the first optical patterns are disposed substantially parallel to the light absorption axis of the polarizer in the longitudinal direction thereof.

In an embodiment, the first resin layer 210 may have a higher index of refraction than the second resin layer 220. For example, a difference in index of refraction between the first resin layer 210 and the second resin layer 220 may be 0.05 or more, for example, 0.05, 0.1, 0.15, 0.2, 0.25, 0.3, and, in an embodiment, 0.05 to 0.3, and, in an embodiment, 0.05 to 0.2. Within this range, the polarizing plate can achieve significant improvement in contrast ratio and diffusion of polarized light emitted from the polarizer.

In an embodiment, the first resin layer 210 may have an index of refraction of 1.50 or more, and, in an embodiment, 1.50 to 1.70. Within this range, the polarizing plate can be easily manufactured and can achieve significant improvement in contrast ratio and diffusion of polarized light.

The first resin layer 210 may be formed of a first resin layer composition including a UV-curable resin and/or a heat curable resin. For example, the first resin layer composition may include any of a polycarbonate resin, a (meth)acrylic resin, an epoxy resin, a urethane resin, and the like.

Second Resin Layer 220

The second resin layer 220 may be formed adjacent to the light exit surface of the polarizer 100 to improve front side brightness. The second resin layer 220 has a patterned upper surface and a patterned lower surface.

A plurality of filling patterns 225 filling at least part of the first optical pattern 211 in the first resin layer 210 may be formed on the upper surface of the second resin layer 220. In an embodiment, a lower surface of the second resin layer 220 may be a totally flat surface.

The second patterned portion is formed on the lower surface of the second resin layer 220. The second patterned portion includes the second optical pattern 221; and the filling portion 223 between two adjacent second optical patterns 221. According to one or more embodiments of the present invention, the second patterned portion is stacked on the light exit surface of the polarizer to be placed adjacent the first patterned portion, thereby enabling remarkable enhancement in front side contrast ratio and front side brightness through interaction between the first patterned portion and the second patterned portion.

Figure 4:
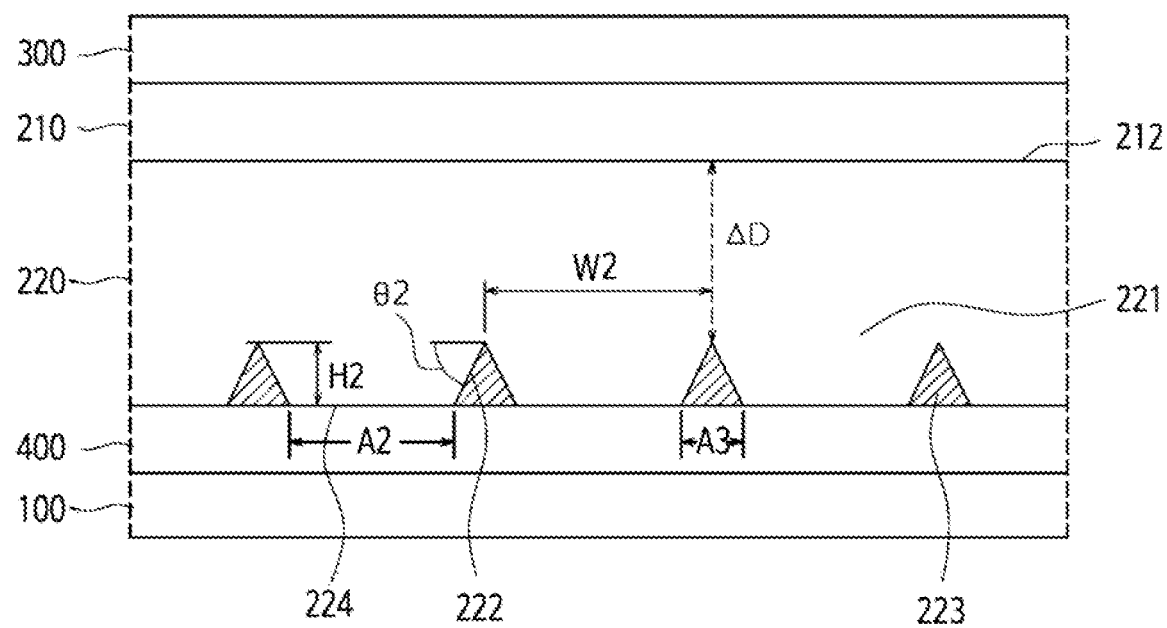
FIG. 4 is a cross-sectional view of the first optical patterns taken in a longitudinal direction along a line III-IV, that is, in a width direction of second optical patterns, in the polarizing plate shown in FIG. 1.

Referring to FIG. 4, in a cross-section of the pattern layer 200 taken in a thickness direction thereof, a shortest distance ΔD between a maximum width W2 of the second optical pattern 221 and a lower surface of the first optical pattern, for example, the separation surface 212, may be 50 μm or less, and, in an embodiment, 0 μm, 1 μm, 2 μm, 3 μm, 4 μm, 5 μm, 6 μm, 7 μm, 8 μm, 9 μm, 10 μm, 11 μm, 12 μm, 13 μm, 14 μm, 15 μm, 16 μm, 17 μm, 18 μm, 19 μm, 20 μm, 21 μm, 22 μm, 23 μm, 24 μm, 25 μm, 26 μm, 27 μm, 28 μm, 29 μm, 30 μm, 31 μm, 32 μm, 33 μm, 34 μm, 35 μm, 36 μm, 37 μm, 38 μm, 39 μm, 40 μm, 41 μm, 42 μm, 43 μm, 44 μm, 45 μm, 46 μm, 47 μm, 48 μm, 49 μm, or 50 μm, and, in an embodiment, 5 μm to 30 μm. Within this range, the polarizing plate can secure advantageous effects from the second optical pattern and the filling portion without any light loss.

Each of the second optical patterns 221 includes a second oblique surface 222, and the filling portion 223 is filled with a reflective material. With this structure, among fractions of light emitted from the polarizer 100 to reach the second resin layer 220, a fraction of the light incident on a side surface of the second resin layer 220 other than a fraction of the light traveling in the vertical direction is reflected by the second oblique surface 222 of the second optical pattern towards the first optical pattern, whereby the polarizing plate can improve front side brightness and front side contrast ratio.

The second optical pattern 221 includes the second oblique surface 222 and a second surface 224 at a bottom portion thereof and may be an embossed optical pattern protruding from the second resin layer 220 to the polarizer 100. With this structure, the polarizing plate can improve front side brightness by the reflective material with a minimum or reduced number of filling portions. In an embodiment, the second oblique surface 222 may be a flat surface or a curved surface. In an embodiment, the second optical pattern 221 may have a trapezoidal cross-section.

In an embodiment, a base angle θ2 defined between a maximum width W2 of the second optical pattern 221 and the second oblique surface 222 thereof may be in a range from 60° to 85°, and, in an embodiment, 60°, 61°, 62°, 63°, 64°, 65°, 66°, 67°, 68°, 69°, 70°, 71°, 72°, 73°, 74°, 75°, 76°, 77°, 78°, 79°, 80°, 81°, 82°, 83°, 84°, or 85°, and, in an embodiment, 70° to 80°. Within this range, the second optical pattern can assist in improvement of front side brightness by affecting a fraction of the light incident on the side surface of the second resin layer 220 other than a fraction of the light traveling in the vertical direction.

As compared with the maximum width W1 of the first optical pattern 211, the second optical pattern 221 has a maximum width W2 satisfying the following Relation 2:

$$0 \text{ μm} < W2 \leq (W1 \times 3),$$ Relation 2 where W1 is the maximum width (unit: μm) of the first optical pattern, and W2 is the maximum width of the second optical pattern (unit: μm).

By satisfying Relation 2, with the second optical patterns having a trapezoidal cross-section, the polarizing plate can minimize or reduce observation of Moiré due to the first optical patterns and the second optical patterns.

In an embodiment, W2/W1 may be greater than 0 and less than or equal to 3, and, in an embodiment, 1 to 3, and, in an embodiment, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, or 3, and, in an embodiment, 2 to 3. Within this range, the polarizing plate can further improve the effects of the invention.

In an embodiment, the maximum width W2 of the second optical pattern 221 may be greater than the maximum width W1 of the first optical pattern 211. In an embodiment, the second optical pattern 221 may have a maximum width W2 of 1 μm to 30 μm, and, in an embodiment, 1 μm, 2 μm, 3 μm, 4 μm, 5 μm, 6 μm, 7 μm, 8 μm, 9 μm, 10 μm, 11 μm, 12 μm, 13 μm, 14 μm, 15 μm, 16 μm, 17 μm, 18 μm, 19 μm, 20 μm, 21 μm, 22 μm, 23 μm, 24 μm, 25 μm, 26 μm, 27 μm, 28 μm, 29 μm, or 30 μm, and, in an embodiment, 5 μm to 30 μm. Within this range, the second optical pattern 221 can easily satisfy Relation 2.

In an embodiment, the second optical pattern 221 may have an aspect ratio (H2/W2) of 0.5 to 5, and, in an embodiment, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, or 5, and, in an embodiment, 0.5 to 1.5. Within this range, the second optical pattern 221 can prevent or substantially prevent observation of a reflective material while allowing brightness enhancement by the reflective material.

In an embodiment, the maximum height H2 of the second optical pattern 221 may be greater than a maximum height H1 of the first optical pattern 211. In an embodiment, the second optical pattern 221 may have a height H2 of 10 μm to 50 μm, and, in an embodiment, 10 μm, 15 μm, 20 μm, 25 μm, 30 μm, 35 μm, 40 μm, 45 μm, or 50 μm, and, in an embodiment, 10 μm to 30 μm. Within this range, the second optical pattern 221 can easily satisfy Relation 2.

In an embodiment, the second surface 224 of the second optical pattern 221 may have a width A2 of 1 μm to 30 μm, and, in an embodiment, 1 μm, 5 μm, 10 μm, 15 μm, 20 μm, 25 μm, or 30 μm, and, in an embodiment, 5 μm to 20 μm. Within this range, the second optical pattern 221 can easily satisfy Relation 2.

In an embodiment, the second resin layer 220 may have an index of refraction of less than 1.50, and, in an embodiment, 1.30 to less than 1.50. Within this range, the polarizing plate can be easily manufactured while securing remarkable improvement in contrast ratio and diffusion of polarized light.

Although not shown in FIG. 4, the second optical patterns may be formed in a stripe shape extending in a longitudinal direction thereof. With the stripe shape extending in the longitudinal direction thereof, the second optical patterns can provide an effect of improving lateral visibility. Here, "longitudinal direction of the second optical pattern" means a different direction than the maximum width of the second optical pattern, and, in an embodiment, a perpendicular direction with respect to a maximum width thereof.

In an embodiment, the longitudinal direction of the second optical pattern may be substantially orthogonal to the longitudinal direction of the first optical pattern. As a result, the second optical patterns can improve front side brightness without affecting transmittance of light emitted from the polarizer. Here, "substantially orthogonal" means an angle in a range of 85° to 95°, and, in an embodiment, 90°.

In an embodiment, the second optical patterns may be disposed substantially parallel (at an angle of −5° to 5°, and, in an embodiment, 0°) or substantially orthogonal (at an angle of 85° to 95°, and, in an embodiment, 90°) to the light absorption axis of the polarizer in the longitudinal direction thereof. In an embodiment, the second optical patterns may be disposed substantially orthogonal to the light absorption axis of the polarizer in the longitudinal direction thereof.

The second resin layer 220 may be formed of a second resin layer composition including a UV-curable resin and/or a heat curable resin. For example, the second resin layer composition may include any of a polycarbonate resin, a (meth)acrylic resin, an epoxy resin, a urethane resin, and the like.

Filling Portion 223

The filling portion 223 may include an engraved pattern composed of the second oblique surface 222 of two adjacent second optical pattern 221 and having a triangular cross-section. The triangular pattern can suppress observation of Moiré, as compared with a pattern having a flat uppermost surface as the filling portion.

In an embodiment, the engraved pattern of the filling portion 223 may be at least partially filled with a reflective material having a reflectivity of 95% or more, and, in an embodiment, 95% to 100%. As a result, the filling portion 223 can improve brightness by reflecting light emitted from the polarizer. The reflective material may include a metal, such as any of aluminum, chromium, nickel, and the like.

Since the filling portion 223 includes a different type of reflective material, compared with the second resin layer 220, the filling portion 223 can be observed when the pattern layer 200 is stacked on the light exit surface of the polarizer 100. In an embodiment, a ratio of the total sum of the widths of the filling portion 223 to the entire width of the second resin layer 220 may be in a range from 10% to 30%, and, in an embodiment, 15% to 25%. Within this range, the filling portion can suppress observation thereof, while securing inherent optical effects from the filling portion.

In an embodiment, the filling portion 223 may have a width A3 of 1 μm to 30 μm, and, in an embodiment, 1 μm, 2 μm, 3 μm, 4 μm, 5 μm, 6 μm, 7 μm, 8 μm, 9 μm, 10 μm, 11 μm, 12 μm, 13 μm, 14 μm, 15 μm, 16 μm, 17 μm, 18 μm, 19 μm, 20 μm, 21 μm, 22 μm, 23 μm, 24 μm, 25 μm, 26 μm, 27 μm, 28 μm, 29 μm, or 30 μm, and, in an embodiment, 10 μm to 20 μm. Within this range, the filling portion can secure effects of the reflective material.

A ratio of a total sum of the maximum width W1 of the first optical patterns to an entire width of the first resin layer 210 and a ratio of a total sum of the width A3 of the filling portion to an entire width of the second resin layer 220 may satisfy the following Relation 4. By satisfying Relation 4, the polarizing plate can secure uniform or substantially uniform brightness and uniform or substantially uniform contrast ratio through adjustment of light reflected by the filling portion and light refracted by the first optical pattern:

$$1 \leq Y_1/Y_2 \leq 5,$$  Relation 4 where $Y_1$ is the ratio of the total sum of the maximum widths of the first optical patterns to the entire width of the first resin layer, and $Y_2$ is the ratio of the total sum of the widths of the filling portions to the entire width of the second resin layer.

In an embodiment, $Y_1/Y_2$ may be 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, or 5, and, in an embodiment, 1 to 3, and, in an embodiment, greater than 1 to 3, and, in an embodiment, 1.1 to 2.5. Within this range, the polarizing plate can further suppress observation of Moiré.

In an embodiment, $Y_1$ may be in a range from 0.3 to 0.7, and, in an embodiment, 0.3, 0.35, 0.4, 0.45, 0.5, 0.55, 0.6, 0.65, or 0.7, and, in an embodiment, 0.4 to 0.7. In another embodiment, $Y_2$ may be in a range from 0.3 to 0.7, and, in an embodiment, 0.3, 0.35, 0.4, 0.45, 0.5, 0.55, 0.6, 0.65, or 0.7, and, in an embodiment, 0.3 to 0.6.

Polarizer 100

The polarizer 100 polarizes incident light from a liquid crystal panel to transmit the polarized light to the second resin layer 220. The polarizer 100 may be stacked on a light incidence surface of the second resin layer 220 for internal light.

In an embodiment, the polarizer 100 may include a polyvinyl alcohol polarizer prepared by uniaxially stretching a polyvinyl alcohol film.

In an embodiment, the polarizer 100 may have a thickness of 5 μm to 40 μm. Within this range, the polarizer can be used in an optical display apparatus.

First Protective Layer 300

The first protective layer 300 may be stacked on a light exit surface of the first resin layer 210 to support the first resin layer 210.

In an embodiment, the first protective layer 300 may have a light transmittance of 90% or more, for example, 90% to 100%. Within this range, the first protective layer 300 allows transmission of light therethrough without affecting incident light.

The first protective layer 300 may include a transparent base. The transparent base may have a different index of refraction, compared with the first resin layer 210.

The transparent base may include an optically transparent resin film having a light incidence surface and a light exit surface facing the light incidence surface. The transparent base may be composed of a single resin film or multiple resin films. The resin may include at least one resin selected from among a cellulose ester resin, such as triacetylcellulose (TAC) and the like, a cyclic polyolefin resin, such as an amorphous cyclic olefin polymer (COP) and the like, a polycarbonate resin, a polyester resin, such as polyethylene terephthalate (PET) and the like, a polyethersulfone resin, a polysulfone resin, a polyamide resin, a polyimide resin, a non-cyclic polyolefin resin, a polyacrylate resin, such as poly(methyl methacrylate) and the like, a polyvinyl alcohol resin, a polyvinyl chloride resin, and a polyvinylidene chloride resin, without being limited thereto. In an embodiment, the transparent base includes a polyester resin including polyethylene terephthalate (PET) and the like, thereby further improving the contrast ratio and visibility.

Although the transparent base may be a non-stretched film, the transparent base may be an isotropic optical film or a retardation film, which is prepared by stretching the resin by a method (e.g., a predetermined method) and has a certain range of retardation.

In an embodiment, the transparent base may be an isotropic optical film having an Re of 0 nm to 60 nm, and, in an embodiment, 40 nm to 60 nm. Within this range, the transparent base can provide good image quality through compensation for viewing angle. Herein, the "isotropic optical film" refers to a film in which nx, ny, and nz (nx, ny, and nz being the indexes of refraction in the slow axis direction, the fast axis direction, and the thickness direction at a wavelength of 550 nm, respectively) have substantially the same value. Here, the expression "substantially the same" includes not only a case in which nx, ny, and nz have exactly the same value, but also a case in which there is an acceptable tolerance.

In another embodiment, the transparent base may be a retardation film having an Re of 60 nm or more. For example, the transparent base may have an Re of 60 nm to 500 nm, or 60 nm to 300 nm. For example, the transparent base may have an Re of 6,000 nm or more or 8,000 nm or more, and, in an embodiment, 10,000 nm or more, and, in an embodiment, greater than 10,000 nm, and, in an embodiment, 10,100 nm to 30,000 nm, or 10,100 nm to 15,000 nm. Within this range, the transparent base can prevent or substantially prevent appearance of rainbow spots while further enhancing improvement in contrast ratio and visibility with respect to light spreading through the first resin layer.

In an embodiment, the transparent base may have a haze of 30% or less, and, in an embodiment, 0.1% to 30%. Within this range, the transparent base can be applied to the polarizing plate.

In an embodiment, the transparent base may have a thickness of 5 μm to 200 μm, for example, 30 μm to 120 μm. Within this range, the transparent base can be applied to the polarizing plate.

The first protective layer 300 may include the transparent base and a functional layer stacked on at least one surface of the transparent base. The functional layer may include at least one selected from among a hard coating layer, a scattering layer, a low reflectivity layer, an ultra-low reflectivity layer, a primer layer, a fingerprint resistant layer, an antireflection layer, and an antiglare layer.

In an embodiment, the first protective layer including the functional layer, for example, an antireflection layer, may have a haze of 5% or less, for example, 0% to 5%. Within this range, the polarizing plate can easily realize the effects of the present invention.

Adhesive Layer 400

The adhesive layer 400 may be interposed between the polarizer 100 and the pattern layer 200 such that the polarizer 100 can be adhesively attached to the pattern layer 200 therethrough.

The adhesive layer 400 may have a higher or lower index of refraction than the second resin layer 220. In an embodiment, the adhesive layer 400 has a lower index of refraction than the second resin layer 220. In an embodiment, the adhesive layer 400 may have an index of refraction of 1.45 to 1.50, and, in an embodiment, 1.46 to 1.49. Within this range, the polarizing plate can improve luminous efficacy.

The adhesive layer 400 may be formed of an adhesive composition including an adhesive resin. The adhesive resin may include any of a (meth)acrylic resin, an epoxy resin, a silicone resin, a urethane resin, an epoxy (meth)acrylate resin, and a urethane (meth)acrylate resin, without being limited thereto.

In an embodiment, the adhesive layer 400 may have a thickness of 1 μm to 20 μm, and, in an embodiment, 7 μm to 15 μm. Within this range, the adhesive layer can secure stable bonding between the polarizer and the pattern layer.

Next, a polarizing plate according to another embodiment will be described.

The polarizing plate according to another embodiment includes: a polarizer; and an adhesive layer, a pattern layer, and a first protective layer sequentially stacked on a light exit surface of the polarizer; and a second protective layer stacked on one surface and/or both surfaces of the polarizer. The polarizing plate according to the present embodiment may be substantially the same as the polarizing plate shown in FIG. 1 except for the second protective layer stacked on one surface and/or both surfaces of the polarizer.

In an embodiment, the second protective layer may have substantially the same configuration as the first protective layer.

An optical display apparatus according to one or more embodiments of the present invention includes the polarizing plate according to an embodiment of the present invention.

In an embodiment, an optical display apparatus may include the polarizing plate according to an embodiment of the present invention as a viewer-side polarizing plate with respect to a liquid crystal panel. Here, the viewer-side polarizing plate refers to a polarizing plate disposed to face a screen with respect to the liquid crystal panel, that is, to face a light source of the optical display apparatus.

In an embodiment, a liquid crystal display may include a light-collecting backlight unit, a light source-side polarizing plate, a liquid crystal panel, and a viewer-side polarizing plate sequentially stacked in the stated order, in which the viewer-side polarizing plate includes the polarizing plate according to an embodiment of the present invention. Here, the light source-side polarizing plate is a polarizing plate at a light source side.

The liquid crystal panel may adopt a vertical alignment (VA) mode, an IPS mode, a patterned vertical alignment (PVA) mode, or a super-patterned vertical alignment (S-PVA) mode, without being limited thereto.

Next, the present invention will be described in further detail with reference to some examples. However, it is to be understood that these examples are provided for illustration and are not to be construed in any way as limiting the present invention.

EXAMPLE 1

(1) A polyethylene terephthalate (PET) film (DSG-23, haze: 5%) having an antireflection layer on an upper surface thereof was prepared.

A first resin layer composition (SSC-5710, Shin-A T&C) containing a UV-curable resin was prepared. A first resin layer having a first patterned portion thereon was formed on a lower surface of the PET film by coating the first resin layer composition to a predetermined thickness on the lower surface thereof, followed by patterning and curing with UV light. The first resin layer had an index of refraction of 1.59, and the first optical patterns had a trapezoidal cross-section.

A second resin layer composition (SSC-4560, Shin-A T&C) containing a UV-curable resin was prepared. A second resin layer having a second patterned portion thereon was formed on a lower surface of the first resin layer by coating the second resin layer composition to a predetermined thickness on the lower surface thereof, followed by patterning and curing with UV light. The second resin layer had an index of refraction of 1.47, and the second optical patterns had a trapezoidal cross-section.

A filling portion filled with chromium was formed by filling a space between adjacent second optical patterns with chromium. The filling portion had a triangular cross-section.

As a result, Laminate 1 of the PET film having an antireflection layer/first resin layer/second resin layer including the filling portion was prepared.

(2) A polarizer (thickness: 13 μm, light transmittance: 44%) was prepared by stretching a polyvinyl alcohol film to 3 times an initial length thereof at 60° C. and dyeing the stretched polyvinyl alcohol film with iodine, followed by stretching the dyed polyvinyl alcohol film to 2.5 times in an aqueous solution of boric acid at 40° C.

A polyethylene terephthalate (PET) film (TA-054, Toyobo Co., Ltd.) was bonded to an upper surface of the polarizer, followed by bonding a cyclic olefin polymer (COP) film (E-ZB12, ZEON Corporation) to a lower surface of the polarizer, thereby preparing Laminate 2 of the PET film/polarizer/COP film.

(3) The second resin layer including the filling portion of Laminate 1 was bonded to the PET film of Laminate 2 via an adhesive layer (index of refraction: 1.47), thereby providing a polarizing plate in which the antireflection layer, the PET film, the first resin layer, the second resin layer including the filling portion, the PET film, the polarizer, and the COP film were sequentially stacked.

In the polarizing plate, the first resin layer and the second resin layer are disposed on a light exit surface of the polarizer, and the longitudinal direction of the second optical pattern is perpendicular to the longitudinal direction of the first optical pattern.

EXAMPLES 2 TO 4

Polarizing plates were prepared in the same manner as in Example 1 except that details of the pattern layer were changed as listed in Table 1.

COMPARATIVE EXAMPLES 1 TO 3

Polarizing plates were prepared in the same manner as in Example 1 except that details of the pattern layer were changed as listed in Table 1.

COMPARATIVE EXAMPLE 4

(1) A polyethylene terephthalate (PET) film (DSG-23, haze: 5%) having an antireflection layer on an upper surface thereof was prepared.

A first resin layer composition (SSC-5710, Shin-A T&C) containing a UV-curable resin was prepared. A first resin layer having a first patterned portion thereon was formed on a lower surface of the PET film by coating the first resin layer composition to a predetermined thickness on the lower surface thereof, followed by patterning and curing with UV light. The first resin layer had an index of refraction of 1.59, and the first optical patterns had a trapezoidal cross-section.

A second resin layer composition (SSC-4560, Shin-A T&C) containing a UV-curable resin was prepared. A second resin layer was formed on a lower surface of the first resin layer by coating the second resin layer composition to a predetermined thickness on the lower surface thereof, followed by curing with UV light. The second resin layer had an index of refraction of 1.47 and did not have the second optical patterns.

As a result, Laminate 1 of the PET film having an antireflection layer/first resin layer/second resin layer was prepared.

(2) A polarizer (thickness: 13 μm, light transmittance: 44%) was prepared by stretching a polyvinyl alcohol film to 3 times an initial length thereof at 60° C. and dyeing the stretched polyvinyl alcohol film with iodine, followed by stretching the dyed polyvinyl alcohol film to 2.5 times in an aqueous solution of boric acid at 40° C.

A polyethylene terephthalate (PET) film (TA-054, Toyobo Co., Ltd.) was bonded to an upper surface of the polarizer, followed by bonding a cyclic olefin polymer (COP) film (E-ZB12, ZEON Corporation) to a lower surface of the polarizer, thereby preparing Laminate 2 of the PET film/polarizer/COP film.

(3) The second resin layer of Laminate 1 was bonded to the PET film of Laminate 2 via an adhesive layer (index of refraction: 1.47), and a resin layer having an optical pattern thereon was formed by coating a resin composition (SSC-5710, Shin-A T&C) containing a UV-curable resin to a predetermined thickness on a lower surface of a COP film, followed by patterning and curing with UV light. The resin layer had an index of refraction of 1.59, and the optical pattern had a trapezoidal cross-section. A filling portion filled with chromium was formed by filling a space between adjacent optical patterns with chromium. The filling portion had a triangular cross-section. Details of the filling portion and the pattern formed on the lower surface of the second resin layer are shown in Table 1.

As a result, a polarizing plate, in which the PET film including an antireflection layer, the first resin layer, the second resin layer, the PET film, the polarizer, the COP film, and the resin layer including the filling portion were sequentially stacked, was prepared.

COMPARATIVE EXAMPLE 5

A polarizing plate was prepared in the same manner as in Example 1 except that the second patterned portion was not formed, and an antireflection layer, a PET film, a first resin layer, a second resin layer, a PET film, a polarizer, and a COP film were sequentially stacked in the stated order. The second resin layer was not formed on a lower surface thereof with a second optical pattern and a filling portion filled with a reflective material.

Each of the polarizing plates prepared in the Examples and Comparative Examples was evaluated as to the following properties using a model for measurement of viewing angle. Results are shown in Table 1.

Light Source-Side Polarizing Plate

A polarizer was prepared by stretching a polyvinyl alcohol film to 3 times an initial length thereof at 60° C., and dyeing the stretched film with iodine, and further stretching the film to 2.5 times in an aqueous solution of boric acid at 40° C. As a base layer, a triacetylcellulose film (thickness: 80 μm) was bonded to both surfaces of the polarizer via a bonding agent for polarizing plates (Z-200, Nippon Goshei Co., Ltd.), thereby fabricating a polarizing plate. The fabricated polarizing plate was used as a light source-side polarizing plate.

Viewer-Side Polarizing Plate

As a viewer-side polarizing plate, the polarizing plates prepared in the Examples and Comparative Examples were used.

Module for Liquid Crystal Display

The light source-side polarizing plate was adhesively attached to a lower surface of a liquid crystal panel, and the viewer-side polarizing plate was adhesively attached to an upper surface thereof. Here, the antireflection layer of the viewer-side polarizing plate was placed as the outermost layer on the upper surface of the liquid crystal panel. A module for liquid crystal displays was prepared by placing a backlight unit under the light source-side polarizing plate.

Brightness in a white mode and in a black mode was measured from a front side (0°) to a right side (90°) and a left side (-90°) in the spherical coordinate system using an EZContrast X88RC (EZXL-176R-F422A4, ELDIM S.A.).

Relative brightness was calculated according to the Equation: (brightness in white mode at front side for each of polarizing plates prepared in Examples and Comparative Examples)/(brightness in white mode at front side for polarizing plate prepared in Comparative Example 5)×100.

Observation of Moiré was evaluated with the naked eye by comparing with screen quality of commercially available products. No observation of Moiré was evaluated as Good, slight observation of Moiré was evaluated as Middle, and severe observation of Moiré was evaluated as Strong.

TABLE 1

|  |  | Example | | | | Comparative Example | | | | |
| --- | --- | --- | --- | --- | --- | --- | --- | --- | --- | --- |
|  |  | 1 | 2 | 3 | 4 | 1 | 2 | 3 | 4 | 5 |
| Pattern | P1 | 14 | 14 | 14 | 14 | 14 | 26 | 14 | 14 | 14 |
| layer | W1 | 9 | 9 | 9 | 9 | 9 | 16 | 9 | 9 | 9 |
|  | H1 | 8 | 8 | 8 | 8 | 8 | 8 | 8 | 8 | 8 |
|  | θ1 | 83 | 83 | 83 | 83 | 83 | 83 | 83 | 83 | 83 |
|  | L | 5 | 5 | 5 | 5 | 5 | 10 | 5 | 5 | 5 |
|  | W2 | 18 | 21 | 24 | 26 | 35 | 35 | 29 | 21 | — |
|  | H2 | 18.5 | 18.5 | 18.5 | 18.5 | 18.5 | 18.5 | 18.5 | 18.5 | — |
|  | A2 | 8 | 11 | 14 | 16 | 25 | 17 | 19 | 11 | — |
|  | A3 | 10 | 10 | 10 | 10 | 10 | 10 | 10 | 10 | — |
|  | ΔD | 5 | 5 | 5 | 5 | 5 | 5 | 5 | — | — |
| Relation 2 |  | ○ | ○ | ○ | ○ | x | ○ | x | ○ | — |
| Y1 |  | 0.64 | 0.64 | 0.64 | 0.64 | 0.64 | 0.63 | 0.64 | 0.64 | — |
| Y2 |  | 0.56 | 0.48 | 0.42 | 0.38 | 0.29 | 0.37 | 0.34 | 0.48 | — |
| Relation 4 |  | 1.14 | 1.33 | 1.52 | 1.68 | 2.21 | 1.7 | 1.88 | 1.33 | — |
| Relative Front Brightness |  | 112 | 111 | 109 | 106 | 103 | 104 | 105 | 75 | 100 |
| Observation of Moiré |  | Good | Good | Good | Good | Middle | Strong | Middle | Good | Good |

As shown in Table 1, the polarizing plates according to the present invention could improve front side brightness and front side contrast ratio while minimizing or reducing observation of Moiré.

By contrast, the polarizing plates of Comparative Examples 1 to 3 failing to satisfy Relations 1 and 2 could not suppress observation of Moiré. The polarizing plate of Comparative Example 4, which includes the pattern layer of the present invention on a light incidence surface of the polarizer while satisfying Relations 1 and 2, exhibited insignificant improvement in front side brightness and front side contrast ratio.

While some embodiments of the present invention have been described herein, it is to be understood that various modifications, changes, alterations, and equivalent embodiments may be made by those skilled in the art without departing from the spirit and scope of the invention.

What is claimed is:

1. A polarizing plate comprising: a polarizer; and a pattern layer stacked on a light exit surface of the polarizer, wherein:
the pattern layer comprises a second resin layer and a first resin layer sequentially stacked from the polarizer;
a first patterned portion comprising a plurality of first optical patterns is formed at an interface between the first resin layer and the second resin layer, each of the plurality of first opitcal patterns comprising a convex pattern protruding from the second resin layer toward the first resin layer;
a second patterned portion comprising a plurality of second optical patterns is formed on a lower surface of the second resin layer, each of the plurality of second optical patterns comprising an embossed pattern protruding from the second resin layer toward the polarizer; and
the first optical patterns and the second optical patterns satisfy the following Relations 1 and 2:

$$0 \text{ μm} < W1 \leq 15 \text{ μm};$$ [Relation 1]

$$0 \text{ μm} < W2 \leq (W1 \times 3),$$ [Relation 2]

where W1 is a maximum width (unit: μm) of the first optical pattern, and W2 is a maximum width (unit: μm) of the second optical pattern, the maximum width of the second optical pattern being greater than the maximum width of the first optical pattern.

2. The polarizing plate according to claim 1, wherein each of the first optical patterns comprises an engraved pattern, has a base angle of 70° to 90°, and satisfies the following Relation 3:

$$1 < P1/W1 \leq 10,$$ [Relation 3]

where P1 is a cycle (unit: μm) of the first patterned portion.

3. The polarizing plate according to claim 2, wherein filling patterns filling at least part of the first optical pattern are formed on an upper surface of the second resin layer.

4. The polarizing plate according to claim 1, wherein the first patterned portion comprises a separation surface between two adjacent first optical patterns of the plurality of first optical patterns.

5. The polarizing plate according to claim 4, wherein each of the plurality of first optical patterns comprises a first oblique surface directly connected to the separation surface, and the first oblique surface is a single flat surface, a curved surface, or an angled flat surface.

6. The polarizing plate according to claim 1, wherein the second patterned portion comprises filling portions between adjacent second optical patterns of the plurality of second optical patterns.

7. The polarizing plate according to claim 6, wherein each of the plurality of second optical patterns comprises a second surface on a bottom portion thereof and a second oblique surface connected to the second surface.

8. The polarizing plate according to claim 7, wherein a base angle defined between the maximum width of the second optical pattern and the second oblique surface is in a range from 60° to 85°.

9. The polarizing plate according to claim 6, wherein a ratio of a total sum of the maximum widths of the first optical patterns to an entire width of the first resin layer and a ratio of a total sum of widths of the filling portions to an entire width of the second resin layer satisfy the following Relation 4:

$$1 \leq Y_1/Y_2 \leq 5,\qquad \text{[Relation 4]}$$

where $Y_1$ is the ratio of the total sum of the maximum widths of the first optical patterns to the entire width of the first resin layer, and $Y_2$ is the ratio of the total sum of the widths of the filling portions to the entire width of the second resin layer.

10. The polarizing plate according to claim 1, wherein each of the plurality of first optical patterns has an aspect ratio of 0.1 to 10, and each of the plurality of second optical patterns has an aspect ratio of 0.5 to 5.

11. The polarizing plate according to claim 1, wherein a longitudinal direction of each of the plurality of second optical patterns is tilted at an angle of −5° to 5° or at an angle of 85° to 95° with respect to a light absorption axis of the polarizer.

12. The polarizing plate according to claim 1, wherein the first resin layer has a higher index of refraction than the second resin layer.

13. The polarizing plate according to claim 12, wherein a difference in index of refraction between the first resin layer and the second resin layer is greater than or equal to 0.05.

14. An optical display apparatus comprising the polarizing plate according to claim 1.

15. The polarizing plate according to claim 1, wherein a ratio of the maximum width of the second optical pattern to the maximum width of the first optical pattern is from 2 to 3.

16. A polarizing plate comprising: a polarizer; and a pattern layer stacked on a light exit surface of the polarizer, wherein:
the pattern layer comprises a second resin layer and a first resin layer sequentially stacked from the polarizer;
a first patterned portion comprising a plurality of first optical patterns is formed at an interface between the first resin layer and the second resin layer;
a second patterned portion comprising a plurality of second optical patterns is formed on a lower surface of the second resin layer; and
the first optical patterns and the second optical patterns satisfy the following Relations 1 and 2:

$$0\ \mu m < W1 \leq 15\ \mu m;\qquad \text{[Relation 1]}$$

$$0\ \mu m < W2 \leq (W1 \times 3),\qquad \text{[Relation 2]}$$

where W1 is a maximum width (unit: μm) of the first optical pattern, and W2 is a maximum width (unit: μm) of the second optical pattern,
wherein each of the plurality of second optical patterns comprises an embossed pattern, and the second patterned portion comprises filling portions between adjacent second optical patterns of the plurality of second optical patterns, and
wherein the filling portions are filled with a light reflective material having a reflectivity of 95% or more.

17. The polarizing plate according to claim 16, wherein the light reflective material comprises at least one selected from among aluminum, chromium, and nickel.

* * * * *